Nov. 10, 1964     F. W. WAKEFIELD     3,156,863
APPARATUS FOR LOCATING A FAULT IN ELECTRIC CABLES
HAVING SEMI-CONDUCTING COVERINGS
Filed May 16, 1960
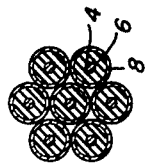
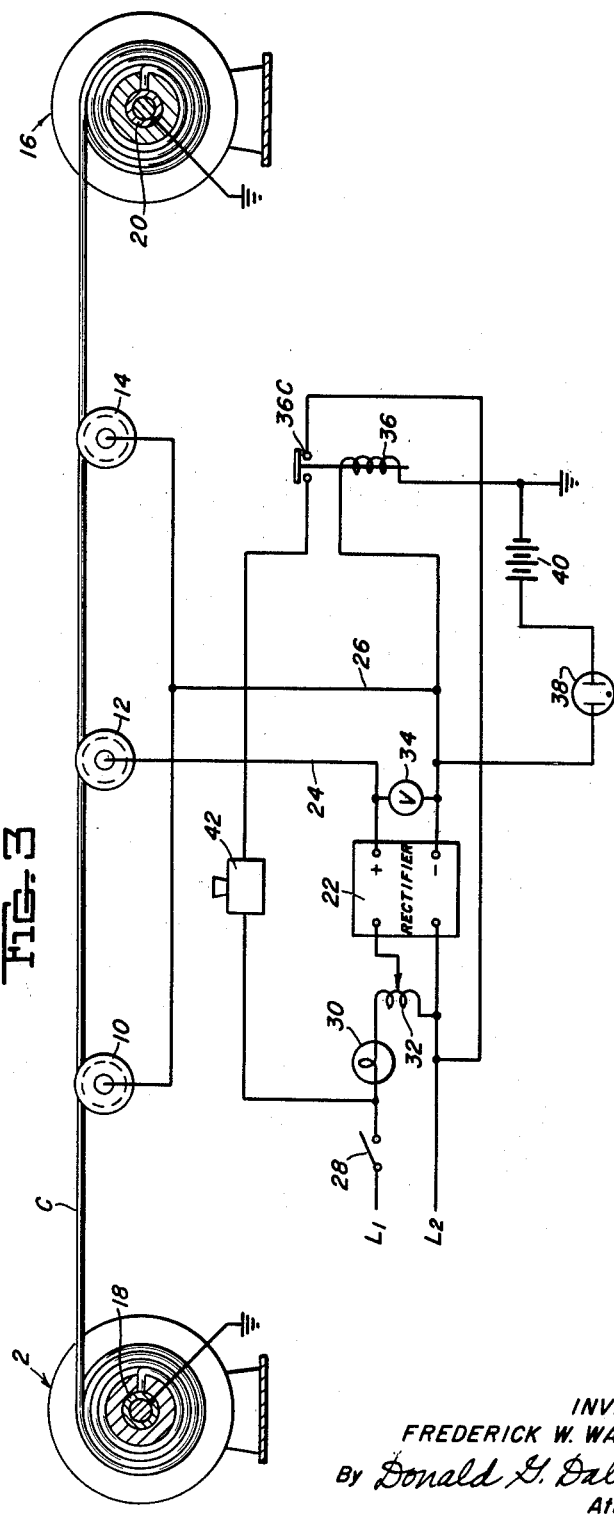
INVENTOR
FREDERICK W. WAKEFIELD
By Donald G. Dalton
Attorney 3,156,863
APPARATUS FOR LOCATING A FAULT IN ELECTRIC CABLES HAVING SEMI-CONDUCTING COVERINGS
Frederick W. Wakefield, Northboro, Mass., assignor to United States Steel Corporation, a corporation of New Jersey
Filed May 16, 1960, Ser. No. 29,282
2 Claims. (Cl. 324—54)

This invention relates to apparatus for locating a fault in electric cables having semi-conducting coverings and more particularly to such apparatus for locating insulation faults as the cable is pulled from one reel to another. Prior to my invention sparkers such as shown in Abrams Patent No. 2,753,521 were used for this purpose. Such testers had the disadvantage that the high A.C. voltage on the electrode caused some current to flow to ground through the semi-conducting covering, this overloading the sparker and causing the signal device to indicate continuously. Current flowing from the metal beads inside the high voltage electrode to the semi-conducting shield or covering causes sparking and burning of the insulation and heating of the semi-conducting layer. The overloaded sparker will not indicate the electric voltage accurately and it may be damaged if operated continuously.

It is therefore an object of my invention to provide an electric cable fault locator which eliminates the foregoing difficulties.

Another object is to provide such apparatus which can operate continuously to locate faults accurately in both single and multiple semi-conducting cables.

These and other objects will be more apparent after referring to the following specification and attached drawings, in which:

FIGURE 1 is a cross sectional view of one type of cable which may be tested in my apparatus;

FIGURE 2 is a view, similar to FIGURE 1, showing a second type of cable which may be tested in my apparatus; and FIGURE 3 is a schematic view of the apparatus of my invention.

Referring more particularly to the drawings reference numeral 2 indicates a pay-off reel for supporting electric cable C to be tested. As shown in FIGURE 1 the cable C consists of a conductor 4 surrounded by insulation 6 which in turn is surrounded by a thin layer of conducting material 8 which forms the shield. The apparatus may also be used with cable such as shown in FIGURE 2 wherein seven cables such as shown in FIGURE 1 are stranded together to provide a multiple conductor cable. It will be seen that the semi-conducting shields 8 contact each other. From the pay-off reel 2 the cable C passes over three spaced apart grooved pulleys 10, 12 and 14 to a take-up reel 16. The pulleys 10, 12 and 14 are insulated from ground and are made of steel or other electrical conducting material. The take-up reel 16 is provided with the usual drive mechanism, not shown, for pulling the cable from reel 2 around or over the pulleys 10, 12 and 14. The end of conductor 4 on reel 2 is connected to slip ring 18 which in turn is connected to ground. The other end of conductor 4 is connected to a similar slip ring 20 on the reel 16. The slip ring 20 is also connected to ground. While it is preferred to have both ends of the conductor 4 connected to ground in the manner shown the cable may be tested with only one such end grounded. A high voltage rectifier 22 has its positive terminal connected by means of lead 24 to pulley 12 and its negative terminal connected by means of lead 26 to pulleys 10 and 14. A 115 A.C. power source L1, L2 is connected through switch 28, lamp 30 and a continuously adjustable autotransformer 32 to the rectifier 22. Closing of the switch 28 energizes the rectifier 22 with the lamp 30 limiting the output of current of the rectifier to a safe value. The variable auto transformer 32 may be of any standard type, such as the General Radio Co. Variac and is used to vary the output voltage of rectifier 22. A volt meter 34 indicates the output voltage of rectifier 22. It will be understood that other high voltage D.C. power sources may be substituted for the rectifier 22. A relay coil 36 has one side connected to lead 26 and the other side connected to ground. A neon lamp 38 and battery 40 are connected in series across the relay coil 36 with the negative terminal of the battery connected to ground. The relay coil 36 has a normally open contact 36C connected in series with a horn 42 to voltage source L1, L2.

In operation with the switch 28 closed and cable passing from reel 2 to reel 16 current normally flows harmlessly through lead 24 to pulley 12 through the semi-conducting shield 8 to pulleys 10 and 14 and back to the negative terminal of rectifier 22. The amount of current flow is controlled by the conductivity of the semi-conducting shield 8, the distance between pulley 12 and pulleys 10 and 14 and the voltage at pulley 12. It is desirable that the distance between pulley 12 and each of the pulleys 10 and 14 be a minimum of three feet. During this time there is little or no current flow through the sensitive relay 36. After a cable fault passes pulley 10 the voltage drop existing in the semi-conducting covering caused by the current flowing from pulley 12 through the semi-conducting covering to the pulley 10 will cause current to flow to ground through the cable conductor and also flow from ground through relay coil 36 to the negative terminal of the rectifier 22 and this current will increase until it reaches the maximum when the fault reaches pulley 12. As the fault approaches or reaches pulley 12 the relay coil 36 will be energized to such an extent that its contact 36C will close and complete a circuit through horn 42 which will blow and so indicate the location of the fault. If the rated current of the relay coil 36 is exceeded the neon lamp 38 glows and acts as a current limiting shunt for the relay coil 36 and protects the relay coil from damage. In a particular installation the D.C. voltage of the battery 40 is selected so that the sum of its voltage and the rated voltage of relay coil 36 is approximately equal to 65 volts. The pulleys 10 and 14 are necessary to prevent current from flowing continuously to ground through the semi-conducting covering 8 which would cause the signal device 36 to indicate continuously.

While one embodiment of my invention has been shown and described, it will be apparent that other adaptations and modifications may be made without departing from the scope of the following claims.

I claim:

1. Apparatus for locating insulation faults in a moving length of electric cable having a semi-conducting covering surrounding an insulated electric conductor comprising a pay-off reel for supporting a length of cable to be tested, a take-up reel spaced from said pay-off reel for pulling said cable from said pay-off reel, three spaced apart pulleys between the pay-off reel and take-up reel over which the cable passes in electrical contact therewith, means for grounding at least one end of the cable conductor, means providing D.C. power, said last named means having two terminals, a lead connecting one of said terminals to the center pulley of said spaced apart pulleys, a lead connecting the other terminal to the other pulleys, a relay coil having one side connected to the second named lead, means connecting the other side of said relay coil to ground, a D.C. power source, a neon lamp connected across said relay coil in series with said D.C. power source, said relay coil having a normally open contact, an A.C. power source, and a signal device connected in series with said contact to said A.C. power source, when a fault occurs in the insulation of the cable between the first and second of said pulleys contacted by said cable current flowing to ground through the cable conductor and back to said means providing D.C. power through said relay coil whereby said signal device is operated.

2. Apparatus for locating insulation faults in a moving length of electric cable having a semi-conducting covering surrounding an insulated electric conductor comprising three spaced apart pulleys over which the cable passes in sequence in electrical contact therewith, means providing D.C. power, said means having two terminals, a lead connecting one of said terminals to the center pulley of said spaced apart pulleys, a lead connecting the other terminal to the other pulleys, current responsive means having one side connected to the second named lead, means for grounding the conductor of said cable, means connecting the other side of said current responsive means to ground, a D.C. power source, a neon lamp connected across said current responsive means in series with said D.C. power source, and signal means operative by said current responsive means to provide a signal when current of a predetermined amount flows therethrough, when a fault occurs in the insulation of the cable between the first and second of said pulleys contacted by said cable current flowing to ground through the cable conductor and back to said means providing D.C. power through said current responsive means whereby said signal means is operated.

References Cited in the file of this patent

UNITED STATES PATENTS

| | | |
|---|---|---|
| 2,837,714 | Hill | June 3, 1958 |
| 2,882,491 | Gooding | Apr. 14, 1959 |
| 2,882,492 | Gooding | Apr. 14, 1959 |
| 2,894,204 | Gambrill | July 7, 1959 |

FOREIGN PATENTS

| | | |
|---|---|---|
| 473,045 | Germany | Mar. 11, 1929 |